United States Patent
Al-Otoom et al.

(10) Patent No.: US 9,632,791 B2
(45) Date of Patent: Apr. 25, 2017

(54) CACHE FOR PATTERNS OF INSTRUCTIONS WITH MULTIPLE FORWARD CONTROL TRANSFERS

(71) Applicant: Apple Inc., Cupertino, CA (US)

(72) Inventors: Muawya M. Al-Otoom, Sunnyvale, CA (US); Ian D. Kountanis, Santa Clara, CA (US); Ronald P. Hall, Austin, TX (US); Michael L. Karm, Austin, TX (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 14/160,242

(22) Filed: Jan. 21, 2014

(65) Prior Publication Data

US 2015/0205725 A1    Jul. 23, 2015

(51) Int. Cl.
*G06F 12/08* (2016.01)
*G06F 9/38* (2006.01)
*G06F 12/0862* (2016.01)

(52) U.S. Cl.
CPC ............ *G06F 9/3844* (2013.01); *G06F 9/381* (2013.01); *G06F 9/3808* (2013.01); *G06F 9/3867* (2013.01); *G06F 12/0862* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 8,370,671 B2 | 2/2013 | Levitan | |
| 2005/0015537 A1* | 1/2005 | Asaad et al. | 711/2 |
| 2006/0155932 A1* | 7/2006 | Rasche | G06F 12/0897 711/125 |
| 2009/0217017 A1 | 8/2009 | Alexander et al. | |
| 2012/0079303 A1* | 3/2012 | Madduri | 713/324 |

(Continued)

OTHER PUBLICATIONS

Sanjay Jeram Patel, Daniel Holmes Friendly and Yale N. Patt. Critical Issues Regarding the Trace Cache Fetch Mechanism. Computer Science and Engineering, University of Michigan Tech. Report. May 1997. https://www.eecs.umich.edu/techreports/cse/97/CSE-TR-335-97.pdf.*

*Primary Examiner* — Reginald Bragdon
*Assistant Examiner* — Edward Wang
(74) *Attorney, Agent, or Firm* — Meyertons, Hood, Kivlin, Kowert & Goetzel, P.C.; Michael B. Davis (57) ABSTRACT

Techniques are disclosed relating to a cache for patterns of instructions. In some embodiments, an apparatus includes an instruction cache and is configured to detect a pattern of execution of instructions by an instruction processing pipeline. The pattern of execution may involve execution of only instructions in a particular group of instructions. The instructions may include multiple backward control transfers and/or a control transfer instruction that is taken in one iteration of the pattern and not taken in another iteration of the pattern. The apparatus may be configured to store the instructions in the instruction cache and fetch and execute the instructions from the instruction cache. The apparatus may include a branch predictor dedicated to predicting the direction of control transfer instructions for the instruction cache. Various embodiments may reduce power consumption associated with instruction processing.

18 Claims, 7 Drawing Sheets

(56) References Cited

U.S. PATENT DOCUMENTS

| | | | |
|---|---|---|---|
| 2012/0117362 A1 | 5/2012 | Bhargava et al. | |
| 2012/0185714 A1* | 7/2012 | Chung | G06F 1/3203 |
| | | | 713/323 |
| 2013/0339699 A1 | 12/2013 | Blasco-Allue et al. | |
| 2013/0339700 A1 | 12/2013 | Blasco-Allue et al. | |
| 2015/0089141 A1* | 3/2015 | Chen et al. | 711/125 |

* cited by examiner

CACHE FOR PATTERNS OF INSTRUCTIONS WITH MULTIPLE FORWARD CONTROL TRANSFERS

BACKGROUND

Technical Field

This disclosure relates generally to computer processing and more specifically to a cache for patterns of instructions.

Description of the Related Art

Computer processors are used in many applications where power consumption is an important design consideration, including mobile phones, tablet devices, server assemblies, etc. Some of the power consumed by a processor is typically used to maintain recent instructions in an instruction cache and predict the direction of branches in program code. In order to reduce power consumption for these tasks, modern processors often utilize a loop buffer to store loops of program instructions that are executed multiple times. Such loops may be fetched and executed from the loop buffer without utilizing other parts of a processing pipeline's front end, thus reducing power consumption. Exemplary embodiments of loop buffers are described in U.S. Patent Application Publication Nos. 2013/0339700 and 2013/0339699. However, current loop buffers are not capable of storing more complex patterns of execution. Examples of more complex patterns of execution include patterns with multiple backward branches and patterns with conditional branches whose behavior changes in different iterations of the pattern.

SUMMARY

Techniques are disclosed relating to a cache for patterns of instructions.

In some embodiments, an apparatus includes an instruction cache and is configured to detect a pattern of execution of instructions by an instruction processing pipeline. The pattern of execution may involve execution of only instructions in a particular group of instructions. The instructions may include multiple backward control transfers and/or a control transfer instruction that is taken in one iteration of the pattern and not taken in another iteration of the pattern. In some embodiments, the apparatus is configured to store the instructions in the instruction cache and fetch and execute the instructions from the instruction cache.

The apparatus, in some embodiments, includes circuitry configured to determine whether patterns of instructions can be stored in the instruction cache (e.g., based on a size of the instruction cache). In one embodiment, the apparatus is configured to reduce power consumption to another, larger instruction cache while fetching and executing from the instruction cache. In some embodiments, the apparatus includes a branch predictor dedicated to predicting the direction of control transfer instructions for the instruction cache. Various embodiments may reduce power consumption associated with instruction processing.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
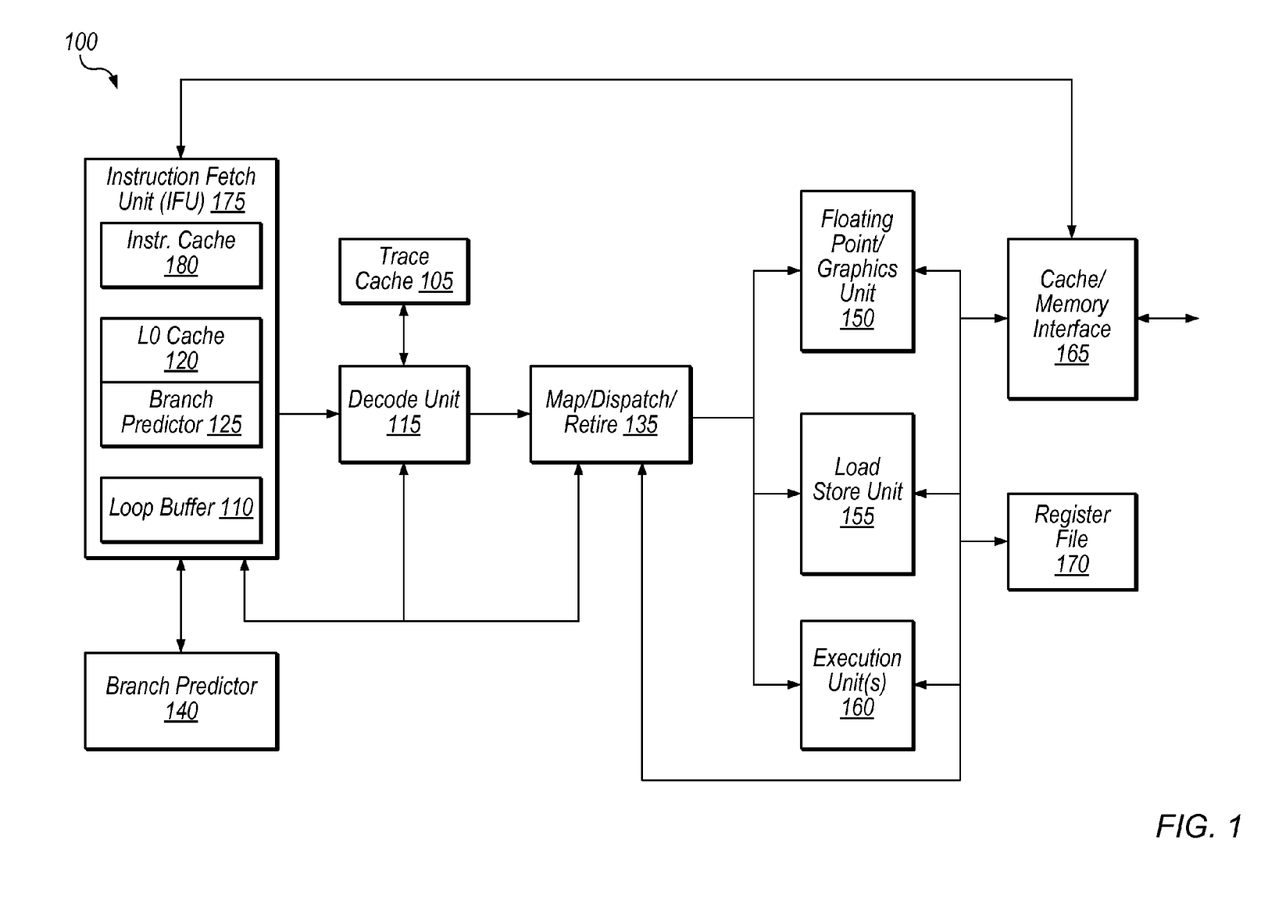
FIG. 1 is a block diagram illustrating an exemplary instruction processing pipeline.

This disclosure initially describes, with reference to FIG. 1, an overview of an exemplary processing pipeline. It then describes, with reference to FIGS. 1-6, embodiments of a processor that includes a cache for patterns of instructions (and, in some embodiments, a dedicated branch predictor for the instruction cache). An exemplary device is described with reference to FIG. 7. In some embodiments, the techniques disclosed herein may reduce power consumption associated with caching instructions and predicting the direction of control transfer instructions.

Pipeline Overview

Referring to FIG. 1, a block diagram illustrating one embodiment of a pipeline of a processor 100 is shown. Processor 100, in the illustrated embodiment, includes instruction fetch unit (IFU) 175, which in turn includes instruction cache 180, L0 cache 120, branch predictor 125, and loop buffer 110. In the illustrated embodiment, IFU 175 is coupled to branch predictor 140. In the illustrated embodiment, IFU 175 is also coupled to an exemplary instruction processing pipeline that begins with a decode unit 115 (which is also coupled to trace cache 105) and proceeds in turn through map/dispatch/retire unit 135, which is coupled to issue instructions to any of a number of instruction execution resources including: execution unit(s) 160, load/store unit (LSU) 155, and/or floating-point/graphics unit (FGU) 150. These instruction execution resources are coupled to register file 170 and/or cache/memory interface 165.

In some embodiments, L0 cache 120 and branch predictor 125 may be used to store and provide patterns of instructions for execution by the pipeline, allowing other processing elements (such as instruction cache 180 and branch predictor 140) to be clock gated, powered down, or otherwise operate in a low-power mode. This may reduce power consumption and/or increase performance of processor 100.

In the following discussion, exemplary embodiments of each of the structures of the illustrated embodiment of processor 100 are described. However, it is noted that the illustrated embodiment is merely one example of how processor 100 may be implemented. Various alternative configurations and variations are possible and contemplated. Further, various structures are shown in FIG. 1 as being connected to one another. These connections may be a bus, point-to-point transmission line, or any other suitable connection as would be known to a person of skill in the art. Not all connections or interfaces between structures in processor 100 are necessarily depicted. Thus, in various embodiments, any or all of the structures depicted in FIG. 1 may be connected as needed to any or all of the other structures by one or more suitable connections.

Instruction fetch unit 175 may be configured to provide instructions to the rest of the pipeline for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated. Instructions may be speculatively executed and may be "completed" when their results are committed to the architectural state of processor 100.

IFU 175, in some embodiments, is configured to fetch instructions from instruction cache 180 and store them for downstream processing, request data from a cache or memory through cache/memory interface 165 in response to misses in instruction cache 180, and predict, in conjunction with branch predictor 140, the direction and target of control transfer instructions (e.g., branches). In some embodiments, IFU 175 may include a number of data structures in addition to instruction cache 180, such as an instruction translation lookaside buffer (ITLB) and/or structures configured to store state that is relevant to thread selection and processing (in multi-threaded embodiments of processor 100).

Loop buffer 110, in some embodiments, is configured to store loops of instructions that are used executed multiple times in order to avoid re-fetching from instruction cache 180 for each iteration of the loop. Exemplary embodiments of loop buffers are described in U.S. Patent Application Publication Nos. 2013/0339700 and 2013/0339699. In some embodiments, L0 cache 120 may be configured to store and provide more complex patterns of instructions than loop buffer 110. In some embodiments, processor 100 may not include loop buffer 110.

Decode unit 115, in some embodiments, is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution.

Branch predictor 140, in some embodiments, is configured to predict the direction of control transfer instructions. This includes, for example, predicting taken or not taken for branch instructions. Branch predictor 140, in some embodiments, may be configured to predict the targets of branch instructions and return instructions. In the illustrated embodiment, branch predictor 140 is configured to predict the direction of all control transfer instructions fetched by IFU 175, which may fetch different instructions following each control transfer instruction, depending on the predictions. Thus, branch predictor 140 may include complex circuitry and may consume significant power during operations. In some embodiments, when IFU 175 is fetching from L0 cache 120, processor 100 is configured to reduce power provided to branch predictor 140 (e.g., by clock gating, powering down, etc.) and use a less complex branch predictor 125 to make prediction based on a much smaller set of information, in order to reduce overall power consumption. In one embodiment, branch predictor 125 is configured to make predictions based on only information corresponding to instructions in L0 cache 120. In other embodiments, branch predictor 125 may be configured to make predictions using information about other instructions as well.

The term "control transfer instruction" refers to an instruction that affects the selection of the next instruction to be executed and completed. For a given program or portion of a program, flow typically proceeds in a sequential fashion. Consider the following group of instructions: ld mem1 → r1; add r1, r2 → r3; st r3 → mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of control transfer instructions potentially affects the selection of the next instruction to be executed and completed. Control transfer instructions may include, without limitation: branches, jumps, calls, returns, etc. Instructions of these types can cause a change in the default behavior of the next instruction to be executed and completed. Control transfer instructions may be used, for example, to execute a loop of instructions. A control transfer instruction "transfers control" or results in a "control transfer" when it changes the default (e.g., sequential) execution of instructions. For example, a taken branch instruction transfers control while a branch instruction that is not taken does not transfer control. A conditional control transfer instruction may transfer control when executed a first time (e.g., when the condition is met) and may not transfer control when executed a second time (e.g., when the condition is not met).

There may also be many different types of control transfer instructions. As discussed above, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may also have effects on processor state other than on the location of the next instruction (e.g., there might be an instruction that transfers control after performing an arithmetic operation or an instruction that both transfers control and alters a condition flag).

Further, as used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, decode unit 115 may be configured to decode an ISA instruction into one or more micro-operations, which may also be referred to as "instructions" when they specify an operation to be performed by a processor pipeline. Thus, a control transfer instruction may or may not be defined by an ISA.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Trace cache 105, in some embodiments, is configured to store traces of decoded instructions. Trace cache 105 may implement any of various techniques known in the art for caching trace paths. For a given starting instruction, trace cache 105 may store multiple traces of instructions following the starting instruction (e.g., for different directions of one or more control transfer instructions following the starting instruction). Thus, trace cache 105 may be configured to store multiple copies of a given instruction corresponding to difference traces (e.g., corresponding to different branch behavior for a block of instructions that includes the given instruction). In contrast, in some embodiments, L0 cache 120 may be configured to store at most one copy of a given instruction. A trace path typically contains only instructions whose results were used in previous execution of the path. Trace cache 105 may store micro-operations in groups of basic blocks in some embodiments. In some embodiments, processor 100 may not include trace cache 105.

Map/dispatch/retire unit 135, in the illustrated embodiment, is configured to map architectural registers to a physical register space, dispatch instructions to execution units, and retire completed instructions. Register renaming may facilitate the elimination of certain dependencies between instructions (e.g., write-after-read or "false" dependencies), which may in turn prevent unnecessary serialization of instruction execution. In one embodiment, unit 135 is configured to rename the architectural destination registers specified by instructions of a particular instruction set architecture (ISA) by mapping them to a physical register space, resolving false dependencies in the process.

Once decoded and renamed, instructions may be ready to be scheduled for performance. Unit 135 may be configured to maintain a schedule queue that stores a number of decoded and renamed instructions as well as information about the relative age and status of the stored instructions. For example, taking instruction dependency and age information into account, unit 135 may be configured to pick one or more instructions that are ready for performance and provide instruction sources and data to the various execution units for picked (i.e. scheduled or dispatched) instructions. In one embodiment, unit 135 includes reservation stations for storing instructions while waiting for their operands and/or for other processing resources to become available. In other embodiments, unit 135 provides instructions to reservation stations distributed among FPU 150, LSU 155, execution unit(s) 160, etc. In one embodiment, unit 135 is configured to read source operands from the appropriate source, which may vary depending upon the state of the pipeline. For example, if a source operand depends on a prior instruction that is still in the execution pipeline, the operand may be bypassed or forwarded directly from the appropriate execution unit result bus. Results may also be sourced from register files representing architectural (i.e., user-visible) as well as non-architectural state. In the illustrated embodiment, processor 100 includes a register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

In some embodiments, unit 135 may include a reorder buffer (ROB). Entries in the ROB may be allocated in program order. Unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

Instructions issued from unit 135 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units, and the execution units may or may not be symmetric in functionality.

LSU 155 may be configured to process data memory references, such as integer and floating-point load and store instructions and other types of memory reference instructions. LSU 155 may include a data cache, load queue, and/or store queue, for example. LSU 155 may be configured to detect misses in a data cache and to responsively request data from a cache or memory through cache/memory interface 165. In some embodiments, LSU 155 may implement a hardware prefetcher configured to predict and prefetch data that is likely to be used in the future, in order to increase the likelihood that such data will be resident in a data cache when it is needed.

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

L0 Cache Embodiments

L0 cache 120, in various embodiments, is configured to store fetched instructions, similarly to instruction cache 180. However, in various embodiments, L0 cache 120 has a size that is smaller than instruction cache 180. Thus, L0 cache 120 may consume less power than instruction cache 180. L0 cache 120 may include 4, 8, 16, 64, cache lines, etc. Each cache line may be configured to store any number of bits of instruction data in various embodiments. Further, L0 cache 120 may be configured to store tag information for each cache line or a single cache tag for all instructions that are stored on sequential or contiguous cache lines. In some embodiments, the size of a cache line of L0 cache 120 is the same size as a cache line of instruction cache 180.

Figure 2:
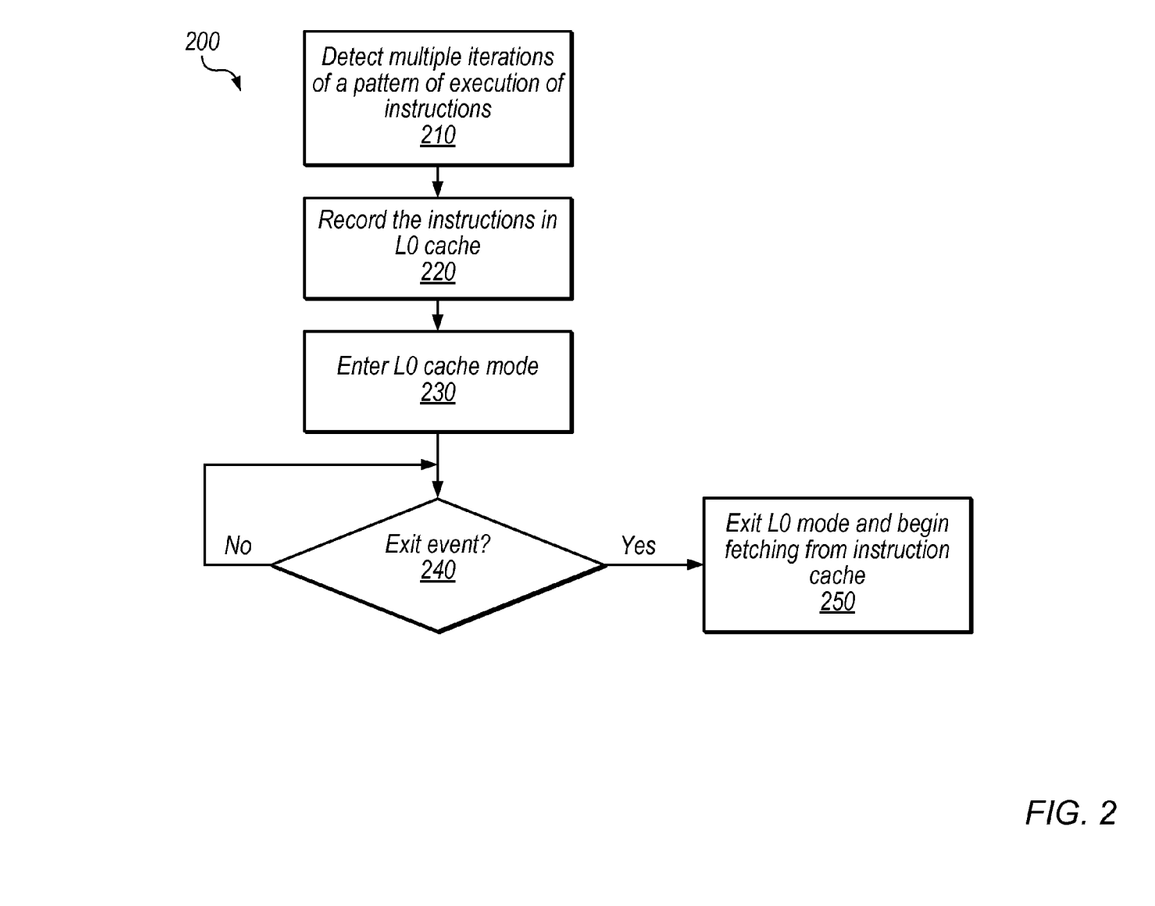
FIG. 2 is a flow diagram illustrating one embodiment of a method for processing instructions using an L0 cache.

Referring now to FIG. 2, a flow diagram illustrating an exemplary embodiment of a method for processing instructions using L0 cache 120 is shown. The method shown in FIG. 2 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 210.

At block 210, processor 100 is configured to detect multiple iterations of a pattern of execution of instructions by processor 100. (Various functionality described herein as performed by processor 100 with respect to L0 cache 120 may be performed by an L0 cache control unit, not shown in FIG. 1.) For example, in some embodiments, processor 100 is configured to detect repeated execution of instructions in a group of instructions.

At block 220, processor 100 is configured to store instructions in the pattern (or in the group of instructions) in L0 cache 120. In various embodiments, processor 100 is configured to determine that the instructions can be stored using the size of L0 cache 120 before storing the instructions. In some embodiments, L0 cache 120 may be implemented as a subset of instruction cache 180. In these embodiments, the size of L0 cache 120 may be configurable.

At block 230, processor 100 is configured to enter an L0 cache mode. In some embodiments, this may include stopping fetching of instructions from instruction cache 180 and powering down (or otherwise reducing power to) instruction cache 180, branch predictor 140, and/or other front-end processing elements. In these embodiments, processor 100 is configured to fetch and execute instructions from L0 cache 120. In one embodiment, processor 100 is configured to predict the direction of control transfer instructions in L0 cache 120 using branch predictor 125. Branch predictor 125 may be configured to use much less power than branch predictor 140 while achieving similar accuracy, e.g., because branch predictor 125 is configured to predict the direction of control transfer instructions based on a smaller amount of data than branch predictor 140. Thus, storing patterns of instructions in L0 cache 120 may reduce power consumption when executing many programs.

At decision block 240, processor 100 is configured to continue fetching and executing instructions from L0 cache 120 until an exit event occurs. Exemplary exit events include a fetched instruction accessing an instruction that is not stored in L0 cache 120 (e.g., branching outside of the pattern) and outside events such as exceptions or traps. When an exit event occurs, processor 100 may resume fetching and executing from instruction cache 180, at least until another pattern is detected. In some embodiments, a mispredicted control transfer instruction does not cause an exit event if the mispredicted control transfer instruction accesses an instruction that is stored in L0 cache 120.

In some embodiments, loop buffer 110 may be configured to store certain patterns of instructions, but may not be configured to predict the direction of control transfer instructions in patterns of instructions. Further, loop buffer 110 may not be configured to handle backward control transfers within patterns of instructions, or control transfers that are taken during some iterations of a pattern and not others. In contrast, L0 cache 120 is configured to handle such patterns in various embodiments.

Figure 3:
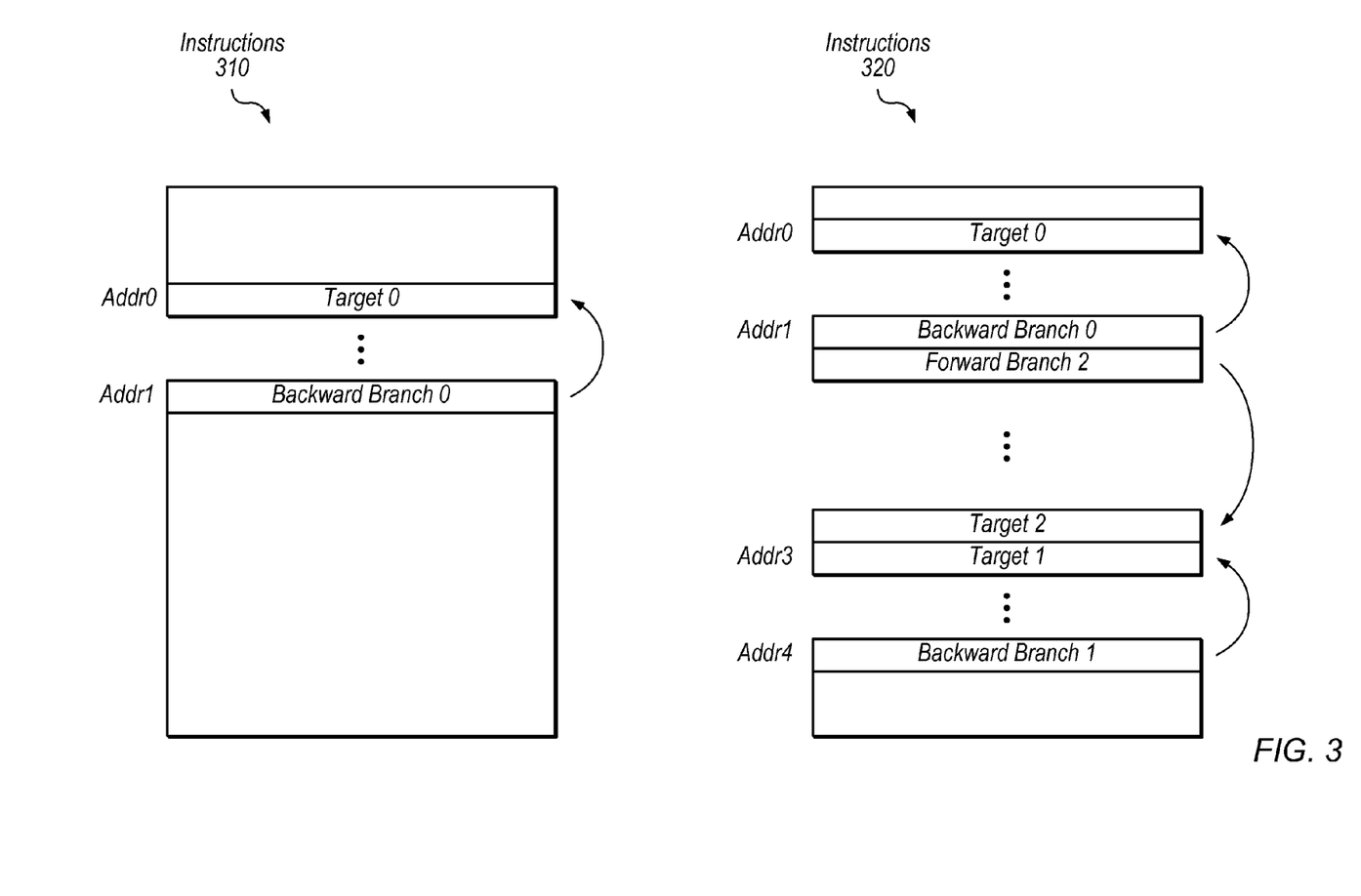
FIGS. 3 and 4 are diagrams illustrating exemplary sets of instructions.

Referring now to FIG. 3, exemplary sets of instructions 310 and 320 are shown. For instructions 310, processor 100 may be configured to determine that instructions in the loop between backward branch 0 and target 0 can be stored in L0 cache 120 (e.g., based on a difference between address 0 and address 1 and the number of cache lines included in L0 cache 120). In some embodiments, loop buffer 110 may also be configured to store such simple loops. Processor 100 may be configured to store instructions between address 0 and address 1 in L0 cache 120 after a particular number of iterations of the loop pattern.

For instructions 320, processor 100 may be configured to determine that instructions in a pattern of execution of instructions 320 can be stored using L0 cache 120. In one embodiment, processor 100 may be configured to make this determination based on the difference between address 4 and address 0. In one embodiment processor 100 may be configured to make this determination even when all instructions between address 0 and address 4 cannot be stored using the size of L0 cache 120. For example, processor 100 may determine that forward branch 2 is taken in each iteration of the pattern and may then store the two loops associated with the two backward branches in L0 cache 120 upon determining that those two loops can be stored in L0 cache 120 (e.g., based on the difference between address 1 and address 0 and the difference between address 4 and address 3). Thus, L0 cache 120 may be configured to store instructions from noncontiguous cache lines, e.g., if instructions between forward branch 2 and target 2 make up at least one complete cache line. In these embodiments, L0 cache 120 may be configured to store tag information for each control transfer instruction in a pattern.

Thus, the instructions between forward branch 2 and target 2 may or may not be considered part of the pattern of execution, e.g., depending on whether forward branch 2 is always taken through the detected iterations of the pattern.

Figure 4:
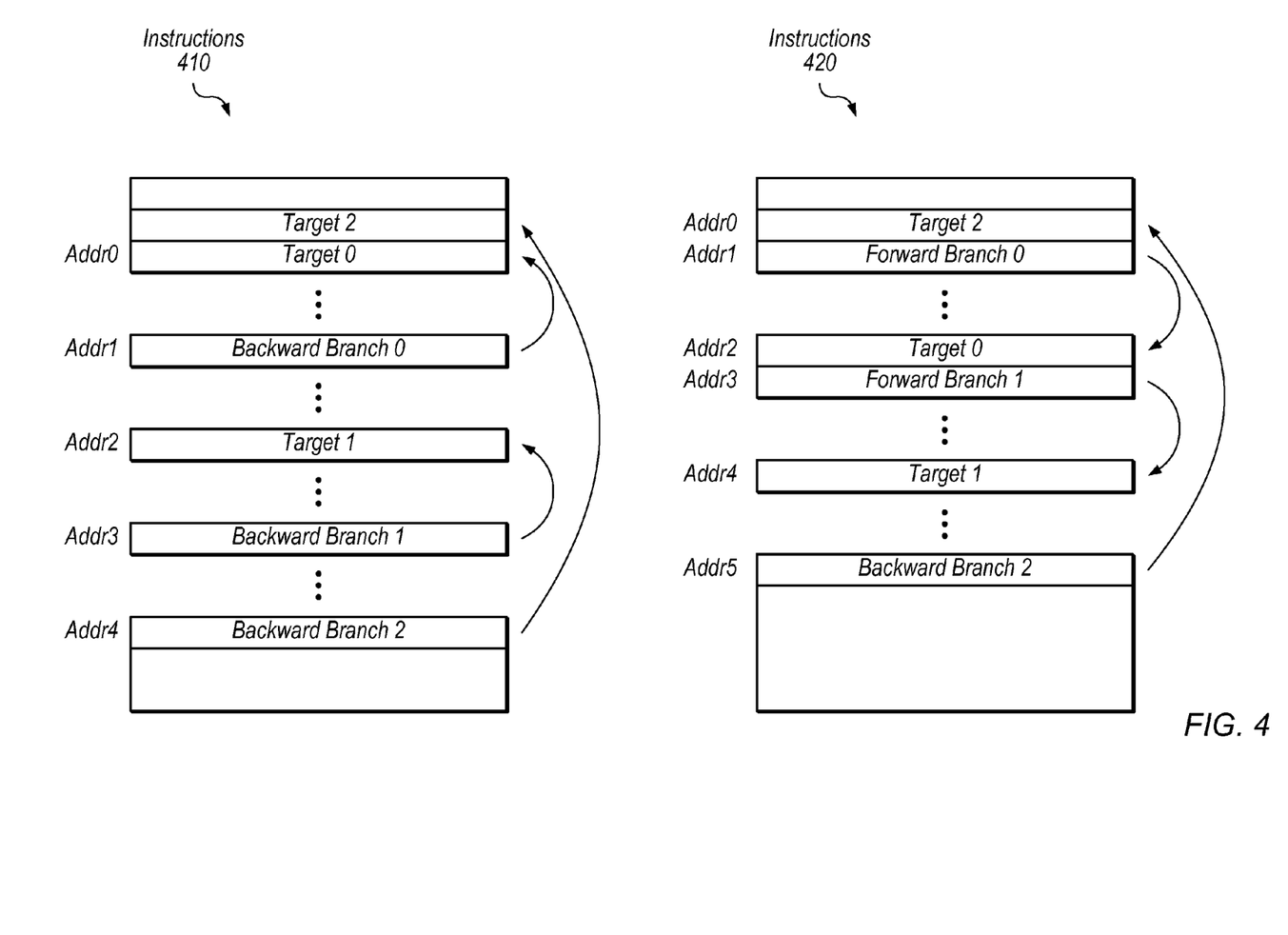

Referring now to FIG. 4, exemplary sets of instructions 410 and 420 are shown. As shown, instructions 410 include a pattern with multiple backward control transfer instructions (backward branches 0, 1, and 2). For instructions 410, processor 100 may be configured to store instructions between address 0 and address 4 in L0 cache 120. In some embodiments, processor 100 may be configured to fetch and execute from this group of instructions until one of the instructions transfers control out of the stored group of instructions (e.g., until backward branch 2 is not taken or an exception occurs). In some embodiments, one or more control transfer instructions may be taken through one iteration of backward branch 2 and not taken through another iteration of backward branch 2. For example, backward branch 1 may be taken one or more times in some iterations of the pattern and not taken in other iterations of the pattern. In contrast, loop buffer 110 is not configured to handle such patterns in various embodiments. Thus, processor 100 may continue to fetch and execute from L0 cache 120 even when control transfer instructions are mispredicted or are based on conditions that change during execution.

As used herein, the phrase "pattern of execution" of instructions is used with reference to a stream of instructions completed by a processor that includes repetition of one or more of a group of instructions. A single instance of execution of the one or more of the group of instructions is referred to as an "iteration" of the pattern. One non-limiting example of a pattern of execution is a simple loop, e.g., as shown by instructions 310 in FIG. 3. In this example, the loop does not include control transfer instructions other than backward branch 0 and each iteration of the pattern involves execution of the same sequence of instructions. In some embodiments, an iteration through a pattern ends with a return to an initial starting point, such as target 0 in this example. More complex patterns may include nested loops, internal conditional control transfers, internal backward control transfers, etc.

For example, instructions 410 and 420 of FIG. 4 illustrate additional non-limiting patterns of execution. In these examples, different iterations through a pattern may not involve exact repetition of a particular sequence of instructions. For example, with reference to instructions 420, a return to target 2 may be said to complete an iteration of the pattern. However, from this initial point, different iterations through the loop formed by backward branch 2 may involve different sequences of instructions (e.g., both forward branches taken, both not taken, one taken and the other not, etc.). Similarly, with reference to instructions 410, different iterations through the loop formed by backward branch 2 may involve various sequences of instructions depending on whether or not backward branch 0 and backward branch 1 are taken in a given iteration (and the number of times these branch are taken in a given iteration). Thus, a pattern of execution does not require execution of the same sequence of instructions for each iteration of the pattern.

At some point, instruction execution may exit a pattern when an instruction branches outside of the pattern (e.g., out of the loop formed by backward branch 2 in instructions 410), one or more instructions (such as backward branch 2) does not transfer control back to an initial starting point of the pattern, or an outside event such as an exception occurs. In this case, the initial point in the pattern may not occur for a long period of time. At that point, processor 100 is configured to resume fetching from instruction cache 180 in some embodiments. Note that instructions that are fetched, but not performed and completed (e.g., because they were fetched speculatively), are not part of a pattern of execution.

For instructions 420, processor 100 may be configured to store instructions between address 0 and address 5. Processor 100 may detect a pattern of execution of these instructions. For example, execution of the instructions may involve multiple iterations of the loop formed by backward branch 2, which may include various traces within the loop. In one embodiment, processor 100 is configured to store instructions between address 0 and address 5 in response to determining that processor 100 completes only instructions in that group of instructions over a given time period. In another embodiment, processor 100 is configured to store instructions between address 0 and address 5 in response to determining that a particular number of iterations of the loop formed by backward branch 2 have occurred. In other embodiments, various criteria may be used for determining when a group of instructions should be stored in L0 cache 120. As discussed above, L0 cache 120 may be configured to store instructions using contiguous or noncontiguous cache lines, in various embodiments.

Figure 5:
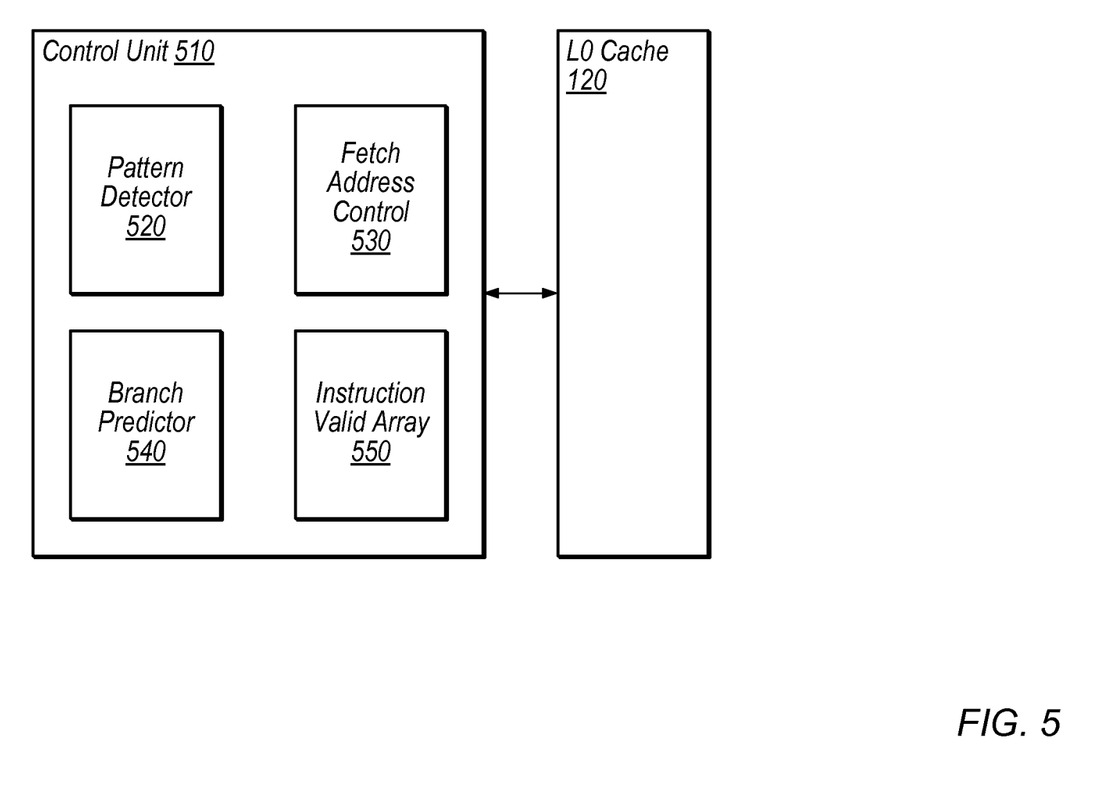
FIG. 5 is a block diagram illustrating one embodiment of an L0 control unit.

Referring now to FIG. 5, a block diagram illustrating one embodiment of a control unit 510 for L0 cache 120 is shown. In the illustrated embodiment, control unit 510 includes pattern detector 520, fetch address control 530, branch predictor 540, and instruction valid array 550. In other embodiments, control unit 510 may include additional elements and/or some of the illustrated elements may be omitted.

Pattern detector 520, in some embodiments, is configured to detect patterns, loops, and/or groups of instructions, e.g., as described above with references to FIGS. 3 and 4. In some embodiments, pattern detector 520 is configured to indicate when a particular number of iterations has occurred and whether the pattern or group of instructions can be stored in L0 cache 120.

Fetch address control 530, in some embodiments, is configured to track the number of control transfer instructions in L0 cache 120. In one embodiment, for each control transfer instruction, fetch address control 530 is configured to store the address of the control transfer instruction, the target address of the control transfer instruction, and whether or not the control transfer instruction is valid. The valid bit may indicate whether the control transfer instruction has actually been completed as part of the pattern. The address and target address information may include only a portion of each address (e.g., enough to identify corresponding cache line) which may include a tag portion.

Branch predictor 540 may correspond to branch predictor 125 of FIG. 1, and is a local branch predictor, in some embodiments. In other embodiments, branch predictor 540 may be implemented using various prediction algorithms. In various embodiments, branch predictor may be less complex than branch predictor 140, because it may be configured to predict for only instructions stored in L0 cache 120.

Instruction valid array 550, in some embodiments, is configured to keep track of which instructions in L0 cache 120 are valid. This may allow sparseness in L0 cache 120. If processor 100 determines that an instruction in a fetch group from L0 cache 120 is invalid, it may be configured to resume fetching from instruction cache 180.

Figure 6:
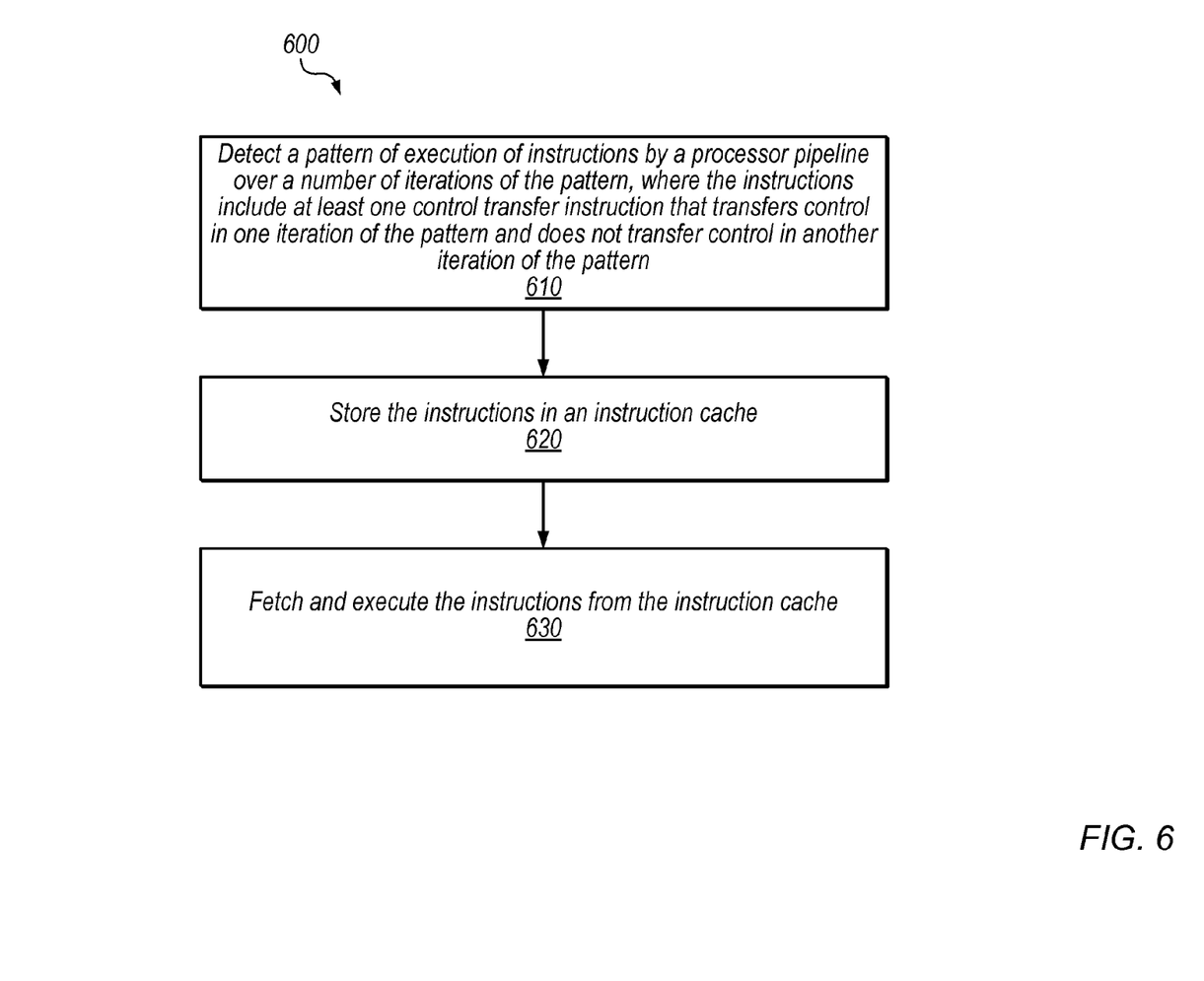
FIG. 6 is flow diagram illustrating one embodiment of a method for caching instructions.

Referring now to FIG. 6, one embodiment of a method for caching a pattern of instructions is shown. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, a pattern of execution of instructions by a processor pipeline is detected over a number of iterations. In this embodiment, the instructions include at least one control transfer instruction that transfers control in one iteration of the pattern and does not transfer control in another iteration of the pattern. In some embodiments, the instructions alternately or additionally include multiple backward control transfers. Flow proceeds to block 620.

At block 620, the instructions are stored in an instruction cache, such as L0 cache 120, for example. The instruction cache may include a plurality of cache lines and may be direct mapped in some embodiments. Flow proceeds to block 630.

At block 630, instructions are fetched and executed from the instruction cache. In some embodiments, processor 100 may fetch and execute only from L0 cache 120 for a given thread and may clock gate or otherwise reduce power to other processing elements such as instruction cache 180. Flow ends at block 630.

Exemplary Device

Figure 7:
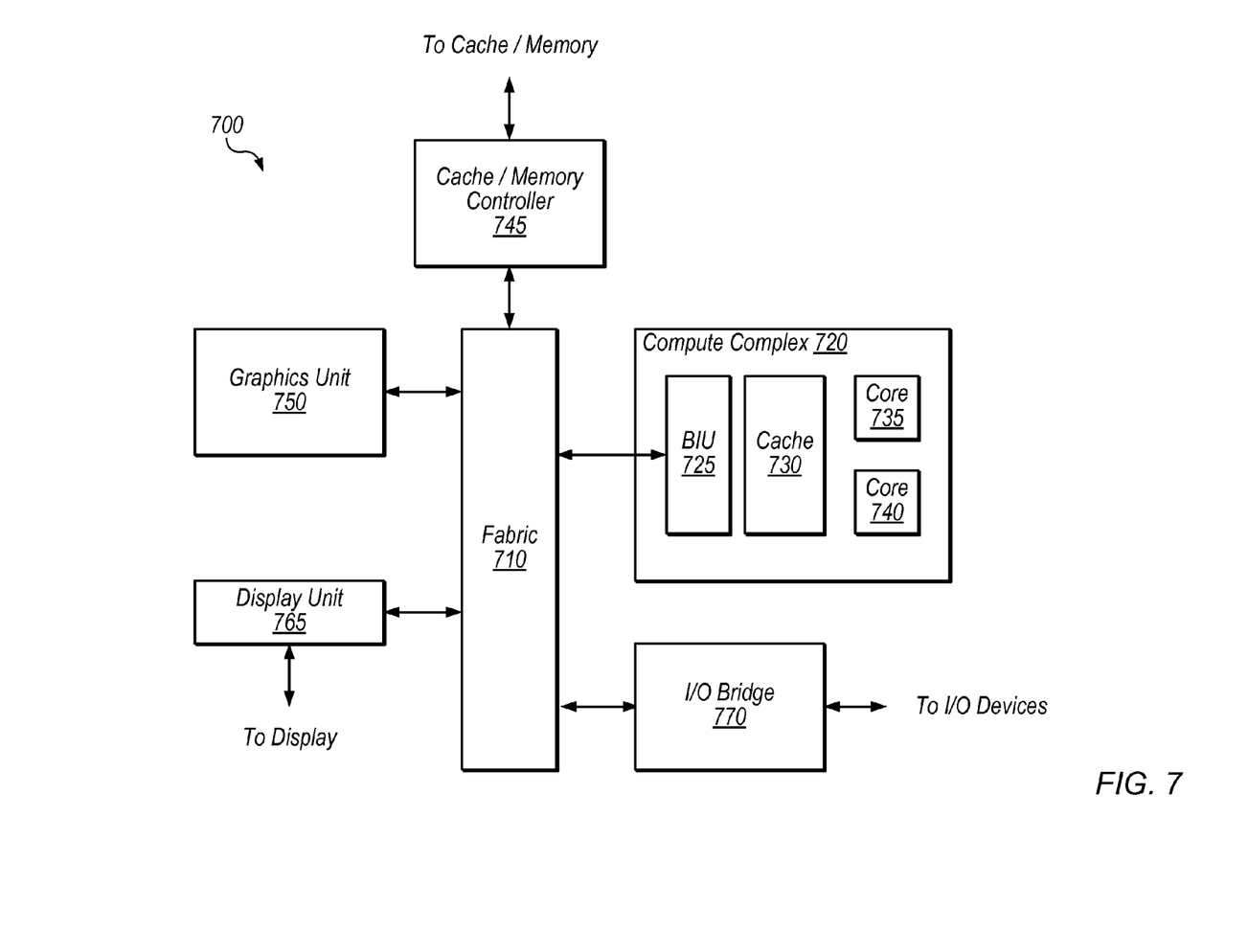
FIG. 7 is a block diagram illustrating one embodiment of a device that includes one or more processors.

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 770, cache/memory controller 745, graphics unit 750, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of cores and/or caches. For example, compute complex 720 may include 1, 2, or 4 processor cores (which may each include one or more pipelines similar to that shown in FIG. 1), or any other suitable number. In one embodiment, cache 730 is a set associative L2 cache. In some embodiments, cores 735 and/or 740 may include internal instruction and/or data caches such as L0 cache 120 and instruction cache 180, for example. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 750 may be described as "coupled to" a memory through fabric 710 and cache/memory controller 745. In contrast, in the illustrated embodiment of FIG. 7, graphics unit 750 is "directly coupled" to fabric 710 because there are no intervening elements.

Graphics unit 750 may be configured to perform various graphics operations. Graphics unit 750 may include one or more processors and/or one or more graphics processing units (GPU's). Graphics unit 750 may receive graphics-oriented instructions, such OPENGL® or DIRECT3D® instructions, for example. Graphics unit 750 may execute specialized GPU instructions or perform other operations based on the received graphics-oriented instructions. Graphics unit 750 may generally be configured to process large blocks of data in parallel and may build images in a frame buffer for output to a display. Graphics unit 750 may include transform, lighting, triangle, and/or rendering engines in one or more graphics processing pipelines. Graphics unit 750 may output pixel information for display images.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 770 may include various elements configured to implement: universal serial bus (USB) communications, security, audio, and/or low-power always-on functionality, for example. I/O bridge 770 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 770.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   an instruction cache; and
   control circuitry configured to:
   detect a pattern of execution of instructions, wherein the instructions are a set of instructions executed by an instruction processing pipeline, based on execution of at least a portion of the instructions in the set of instructions multiple times, wherein the pattern includes multiple forward control transfer instructions within a loop;
   wherein at least one of the multiple forward control transfer instructions, during a time interval between detecting the pattern and exiting the pattern, transfers control in one iteration of the pattern and does not transfer control in another iteration of the pattern; and
   wherein at least one cache line between at least one of the multiple forward control transfer instructions and its target is not included in the pattern; and
   store the set of instructions in the instruction cache, wherein the apparatus is configured to store at most one copy of each instruction in the pattern in the stored set of instructions;
   wherein the apparatus is configured to fetch and execute the instructions from the instruction cache.

2. The apparatus of claim 1, wherein the control circuitry is further configured to:
stop fetching from a second, larger instruction cache in response to the detection; and
resume fetching from the second, larger instruction cache instead of the instruction cache in response to one of the instructions fetched from the instruction cache accessing an instruction that is not stored in the instruction cache.

3. The apparatus of claim 1, wherein the control circuitry is further configured to determine that a size of the instruction cache is sufficient to store the entirety of the instructions before storing the instructions in the instruction cache.

4. The apparatus of claim 1, further comprising:
a branch predictor configured to predict the direction of control transfer instructions of the instructions while the apparatus is fetching and executing from the instruction cache.

5. The apparatus of claim 4, wherein the control circuitry is configured, in response to a mispredicted control transfer instruction by the branch predictor, to continue fetching instructions from the instruction cache if the mispredicted control transfer instruction accesses an instruction that is stored in the instruction cache.

6. The apparatus of claim 1, further comprising:
one or more storage elements configured to maintain validity information, address information, and target address information for each control transfer instruction of the instructions.

7. The apparatus of claim 1, wherein the instruction cache is configured to store the instructions using a plurality of cache lines and using tag information for each of the plurality of cache lines.

8. A method, comprising:
detecting a pattern of execution of instructions by a processor pipeline over a number of iterations of the pattern, wherein detecting includes identifying that:
the pattern includes multiple forward control transfer instructions within a loop;
at least one of the multiple forward control transfer instructions, during a time interval between detecting the pattern and exiting the pattern, transfers control in one iteration of the pattern and does not transfer control in another iteration of the pattern; and
at least one cache line between at least one of the multiple forward control transfer instructions and its target is not included in the pattern;
storing the instructions in an instruction cache, including storing at most one copy of each instruction in the pattern in the stored set of instructions; and
fetching and executing the instructions from the instruction cache.

9. The method of claim 8, wherein the instructions include a plurality of backward control transfers.

10. The method of claim 8, further comprising:
reducing or eliminating power provided to a second, larger instruction cache in response to the detecting.

11. The method of claim 8, further comprising:
predicting the direction of control transfer instructions of the instructions during the fetching and executing, wherein the predicting is based only on execution of the instructions of the pattern of execution.

12. The method of claim 8, wherein the instructions include at least one set of nested loops.

13. The method of claim 8, further comprising:
storing the instructions using multiple cache lines of the instruction cache; and
storing tag information corresponding to each of the multiple cache lines.

14. An apparatus, comprising:
an instruction processing pipeline;
an instruction cache having a first size; and
control circuitry configured to:
detect repeated execution of instructions in a group of instructions, including to identify that the group includes multiple forward control transfer instructions within a loop and that at least one cache line between at least one of the multiple forward control transfer instructions and its target is not included in the group;
store the group of instructions in the instruction cache, wherein the apparatus is configured to store at most one copy of each instruction in the group in the stored group of instructions;
wherein the instruction processing pipeline is configured to:
fetch and execute instructions from the stored group a plurality of times; and
execute a forward control transfer instruction in the group of instructions a plurality of times during a time interval between beginning to execute the stored group of instructions and exiting the group of instructions, including at least one execution that transfers control and at least one execution that does not transfer control.

15. The apparatus of claim 14, further comprising:
a branch predictor configured to predict the direction of control transfer instructions when the apparatus is fetching and executing instructions from the instruction cache.

16. The apparatus of claim 14, wherein the group of instructions includes a plurality of backward control transfers.

17. The apparatus of claim 14, further comprising:
a second instruction cache having a second size that is greater than the first size;
wherein the apparatus is configured to reduce power to at least a portion of the second instruction cache in response to detecting repeated execution of instructions in the group of instructions; and
wherein the apparatus is configured to begin fetching and executing instructions from the second instruction cache in response to one of the instructions fetched from the instruction cache accessing an instruction that is not in the group of instructions.

18. The apparatus of claim 14, wherein the control circuitry is further configured to determine that only instructions in the group of instructions are executed by the instruction processing pipeline over a given period before storing the group of instructions.

* * * * *